Figure 1:
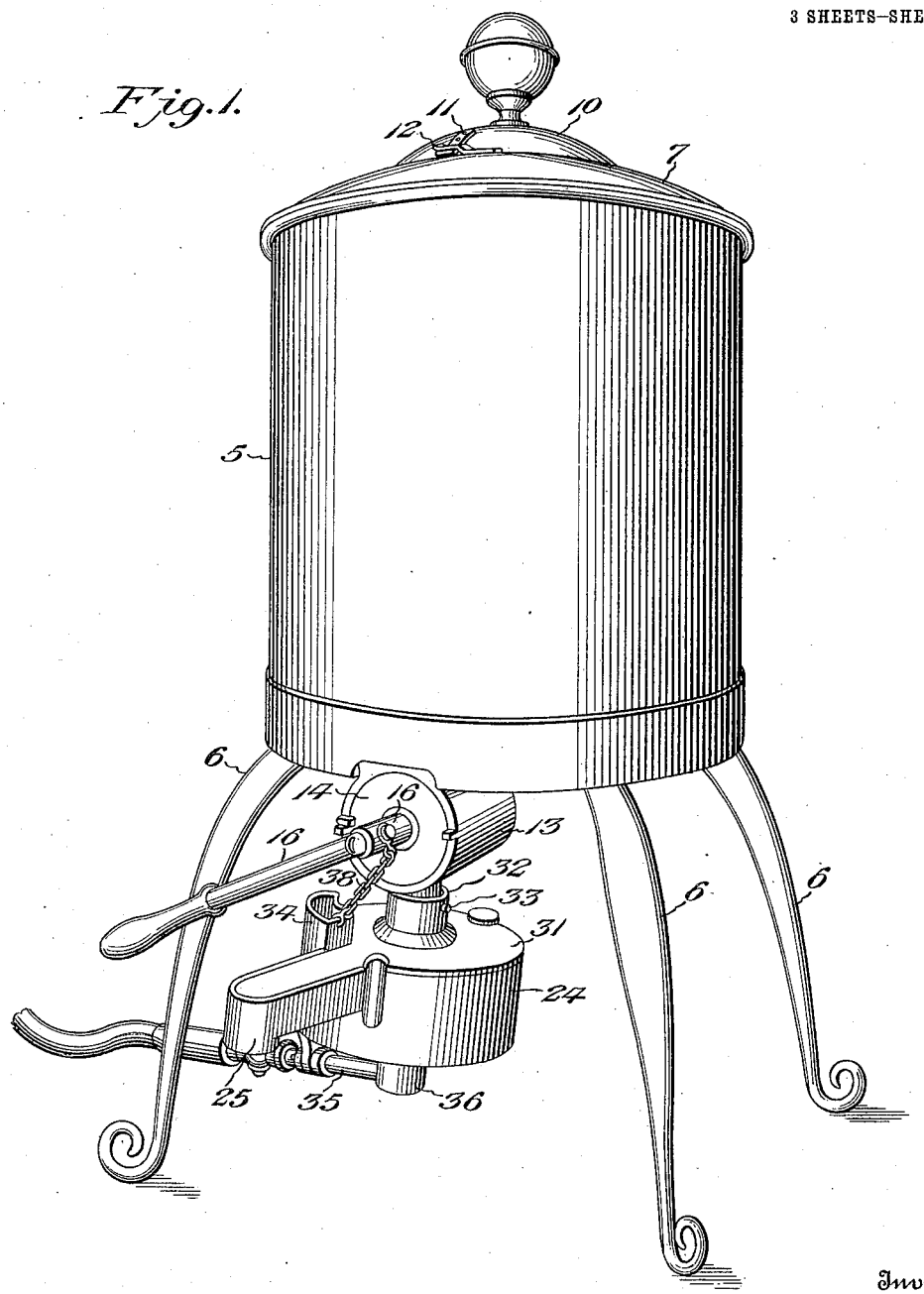

F. T. PERCY.
LIQUID DISPENSING MACHINE.
APPLICATION FILED DEC. 10, 1910.

1,030,854.

Patented June 25, 1912.

3 SHEETS—SHEET 3.

Witnesses
Edwin G. McKee

Inventor
Frank T. Percy
By Victor J. Evans
Attorney

UNITED STATES PATENT OFFICE.

FRANK T. PERCY, OF ROCHESTER, NEW YORK, ASSIGNOR TO ELIZABETH L. HUYCK, OF ROCHESTER, NEW YORK.

LIQUID-DISPENSING MACHINE.

1,030,854.  Specification of Letters Patent.  Patented June 25, 1912.

Application filed December 10, 1910. Serial No. 596,623.

*To all whom it may concern:*

Be it known that I, FRANK T. PERCY, a citizen of the United States, residing at Rochester, in the county of Monroe and State of New York, have invented new and useful Improvements in Liquid-Dispensing Machines, of which the following is a specification.

The invention relates to a dispensing apparatus, and more particularly to the class of combined liquid measuring and dispensing apparatus.

The primary object of the invention is the provision of an apparatus of this character in which liquid, such as milk or cream may be dispensed in predetermined quantities therefrom, without possibility of waste thereof.

Another object of the invention is the provision of a dispensing apparatus in which cream or milk may be held and at the same time will permit the drawing off of the liquid in predetermined quantities for the flavoring of coffee, tea or other beverages.

A further object of the invention is the provision of an apparatus of this character in which the contents thereof may be delivered in predetermined quantities, and that will be heated prior to its delivery from the said apparatus, thereby obviating the necessity of heating the entire contents of the latter.

A still further object of the invention is the provision of an apparatus of this character in which the adjunct parts thereof may be readily and easily cleaned, thus making the same entirely sanitary.

A still further object of the invention is the provision of an apparatus of this character in which the quantity of substance to be delivered therefrom will be measured into a predetermined quantity for delivery, and that will be prevented from dripping after such predetermined quantity has been dispensed, thus obviating waste of the fluid.

With these and other objects in view, the invention consists in the construction, combination and arrangement of parts, as will be hereinafter more fully described, illustrated in the accompanying drawings, and pointed out in the claims hereunto appended.

Figure 2:
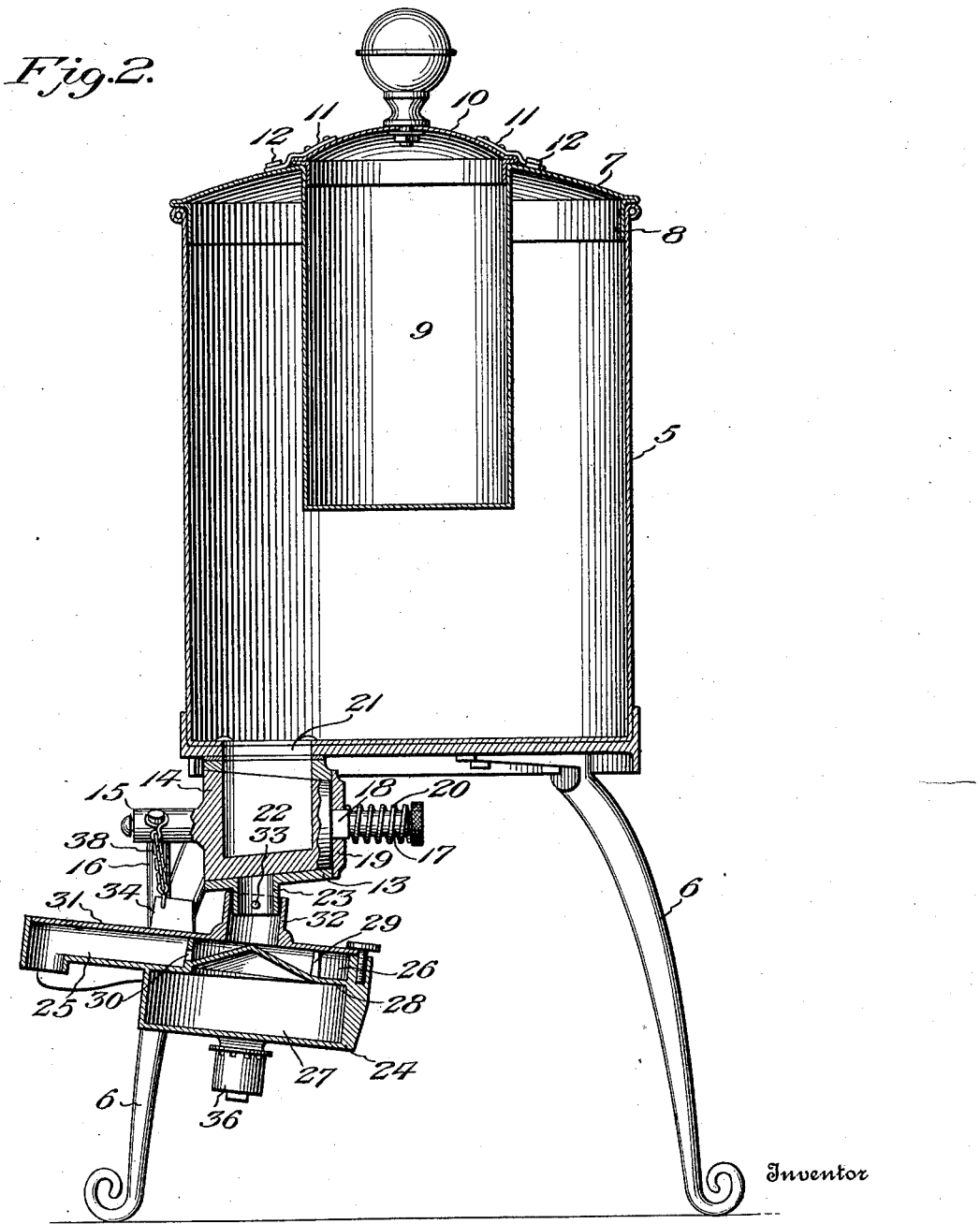
Figure 3:
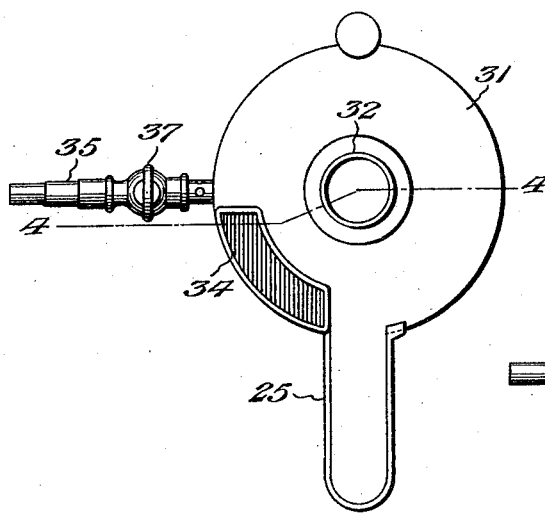
Figure 4:
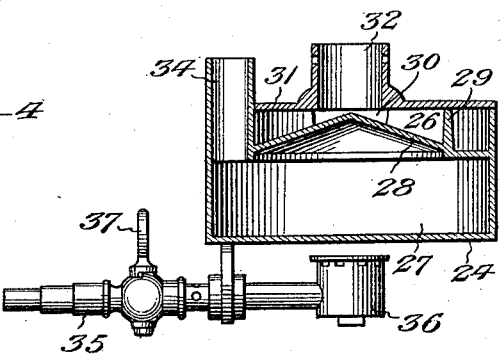
Figure 5:
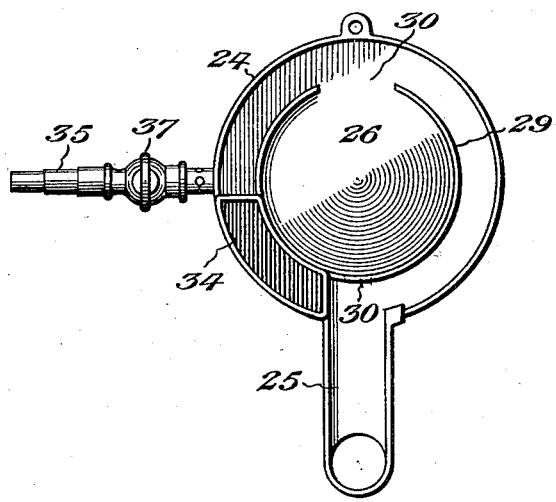
Figure 6:
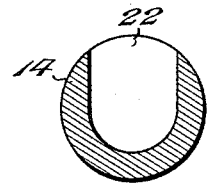

In the drawings: Figure 1 is a perspective view of an apparatus constructed in accordance with the invention. Fig. 2 is a vertical longitudinal sectional view thereof. Fig. 3 is a top plan view of the delivery cup attachment removed therefrom. Fig. 4 is a sectional view on the line 4—4 of Fig. 3. Fig. 5 is a perspective view of the removable closure for the delivery cup of the apparatus. Fig. 6 is a vertical transverse sectional view through the core in the valve shell or casing.

Similar reference characters indicate corresponding parts throughout the several views of the drawings.

Referring to the drawings by numerals, 5 designates a cylindrical tank or reservoir, the same being supported by legs 6, and the upper open end of this tank is normally closed by a removable cover or top 7 provided with an annular depending flange 8 adapted to telescope within the said tank for forming an air tight closure therefor. Depending centrally from the top or lid 7 is an ice cell 9, the latter opening through the said top or lid, and is closed by a cover 10 provided with longitudinally extending catches 11 fixed to and projecting at diametrically opposite points thereof and adapted to engage keepers 12 suitably secured to the top or lid 7 of the tank.

Suitably secured to the bottom of the tank or reservoir 5 at the front thereof is a valve shell or casing 13, in which is rotatably mounted a hollow turning core 14 forming a valve, the core being rearwardly tapered and likewise is the shell or casing 13. Projecting forwardly centrally from the core 14 is a stud or stem 15 in which is detachably fitted a turning handle or crank 16, whereby the said core may be manually rotated within the casing or shell. Axially alining with the stem 15 and projecting from the rear end of the core 14 is a headed shank or stem 17, the latter being squared, as at 18, contiguous the rear end of the core 14, and its squared portion fits into a correspondingly shaped aperture formed centrally in a disk or closing gland 19 which is designed to close the rear end of the casing or shell 13 and is adapted to rotate with the core. Surrounding the stem 17 is a coiled expansion spring 20, the latter having one end bearing against the said disk or gland 19 and its opposite end working against the head of the said stem 17, the spring being adapted to press the disk or gland 19 against the shell or casing 13 for assuring a tight joint, so as to prevent any leakage of fluid held by the core. The shell or casing 13 is provided with a suitable opening registering with a discharge port 21 formed in the bottom of the tank 5 for establishing communication therebetween.

The core 14 within the valve casing or shell 13 is provided with an inlet opening 22 which is adapted to be brought into register with the opening or port 21 in the bottom of the tank 5, so that liquid therein may freely flow into the said core 14, whereby it may be dispensed therefrom in a predetermined quantity. Integral with the core or shell 14 is a discharge nipple 23, to which is connected a delivery cup, as will be hereinafter more fully described. This delivery cup comprises a hollow cup-shaped body 24 having a forwardly extending delivery spout 25, the body 24 being divided into independent superposed chambers 26 and 27, by means of a horizontally disposed partition or web 28, the latter being conoidal-shaped, and concentric to its apex is formed an annular flange 29 rising into the chamber 26, said flange being formed with diametrically opposed passages or openings 30 in substantial alinement with the delivery spout 25, so that liquid fed upon the partition or web 28 will be discharged to the spout. This flange 29 serves to prevent the splashing of the liquid received in the chamber 26 in the cup. The said cup is closed by a detachable closure plate 31 which extends over the delivery spout 25.

The closure plate 31 is formed with a circular boss 32 which is adapted to receive the nipple 23 and passed through this boss 32 and the said nipple 23 is a pivot pin 33, the latter being adapted to connect the delivery cup to the valve casing or shell 13, whereby the said cup may swing alternately in a rearward and forward inclination, in a manner as will be hereinafter more fully described.

Formed on the cup is a walled water inlet vent or filling spout 34, the latter communicating with the chamber 27, so that water may be introduced thereinto, whereby it may become heated for warming the liquid delivered into the chamber 26 from the core 14 in the valve casing. Suitably secured to the bottom of the delivery cup is a gas tube 35, the same being formed with a burner head 36 disposed centrally beneath the delivery cup and this gas tube 35 is connected in any suitable manner with a gas supply, the burner when lighted being adapted to heat the cup for the heating of the water contained in the chamber 27 therein, for a purpose as above described. This gas tube 35 is provided with the usual cut-off valve 37, whereby the supply of gas passing through the tube may be controlled.

Connected to the filling spout 34 is one end of a flexible chain 38, the opposite end thereof being connected with the turning crank or handle 16, so that when the latter is in position whereby the core has been shifted to close the communication between the valve casing and delivery cup, the said cup will be tilted at a rearward inclination, thus preventing any liquid held in the chamber 26 from dripping from the spout 25 projecting forwardly from said cup. However, upon turning the crank in a direction to turn the core 14 for dispensing its contents within the cup, the latter will become forwardly tilted to discharge the liquid delivered thereinto from the core 14, thus assuring a positive delivery of the quantity of liquid measured by the core 14 and delivered into the said cup.

It will be obvious that the fluid contained in the heating cup may be entirely drained therefrom, without the burning of the milk fluid upon the surface of the same.

What is claimed is:

1. A dispensing apparatus of the class described, comprising a tank, a measuring valve communicating with the tank, and a heated delivery element pivotally connected to and coöperative with the valve, and adapted to be rearwardly tilted when the valve is in position for receiving fluid from the tank.

2. A dispensing apparatus of the class described, comprising a tank, a measuring valve communicating with the tank, a heated delivery element pivotally connected to and coöperative with the valve, and adapted to be rearwardly tilted when the valve is in position for receiving fluid from the tank, and means for heating said delivery element.

3. A dispensing apparatus of the class described, comprising a tank, a measuring valve communicating with the tank, a heated delivery element pivotally connected to and coöperative with the valve and adapted to be rearwardly tilted when the valve is in position for receiving fluid from the tank, and means for heating said delivery element, the said delivery element containing a water chamber.

4. A dispensing apparatus comprising a tank, a valve shell having communication with the tank, a measuring valve rotatably held within the shell, and a rocking delivery element coöperative with the valve and having connection with said last-named means to hold the said element at a rearward inclination to prevent dripping of the contents therefrom.

5. A dispensing apparatus comprising a tank, a valve shell having communication with the tank, a measuring valve rotatably held within the shell, a rocking delivery element coöperative with the valve and having connection with said last-named means to hold the said element at a rearward inclination to prevent dripping of the contents therefrom, and a heater carried by the said delivery element.

6. A dispensing apparatus comprising a tank, a valve shell having communication with the tank, a measuring valve rotatably held within the shell, a rocking delivery element coöperative with the valve and having connection with said last-named means to hold the said element at a rearward inclination to prevent dripping of the contents therefrom, a heater carried by the said delivery element, the said delivery element being provided with independent liquid chambers, and a removable lid closing one of said chambers.

7. A dispensing apparatus comprising a tank, a valve shell having communication with the tank, a measuring valve rotatably held within the shell, a rocking delivery element coöperative with the valve and having connection with said last-named means to hold the said element at a rearward inclination to prevent dripping of the contents therefrom, a heater carried by the said delivery element, the said delivery element being provided with independent liquid chambers, and a removable lid closing one of said chambers.

8. A dispensing apparatus comprising a tank, a valve shell having communication with the tank, a measuring valve rotatably held within the shell, a rocking delivery element coöperative with the valve and having connection with said last-named means to hold the said element at a rearward inclination to prevent dripping of the contents therefrom, a heater carried by the said delivery element, the said delivery element being provided with independent liquid chambers, a removable lid closing one of said chambers, and a closure for said tank.

9. A dispensing apparatus comprising a tank, a valve shell having communication with the tank, a measuring valve rotatably held within the shell, a rocking delivery element coöperative with the valve and having connection with said last-named means to hold the said element at a rearward inclination to prevent dripping of the contents therefrom, a heater carried by the said delivery element, the said delivery element being provided with independent liquid chambers, a removable lid closing one of said chambers, a closure for said tank, and manually operated means connected with the valve for opening the same.

In testimony whereof I affix my signature in presence of two witnesses.

FRANK T. PERCY.

Witnesses:
F. A. HOWARD,
CHARLES C. PERCY.

---

Copies of this patent may be obtained for five cents each, by addressing the "Commissioner of Patents, Washington, D. C."